Patented Jan. 6, 1931

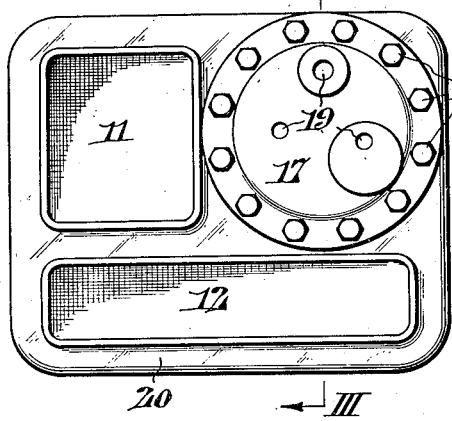
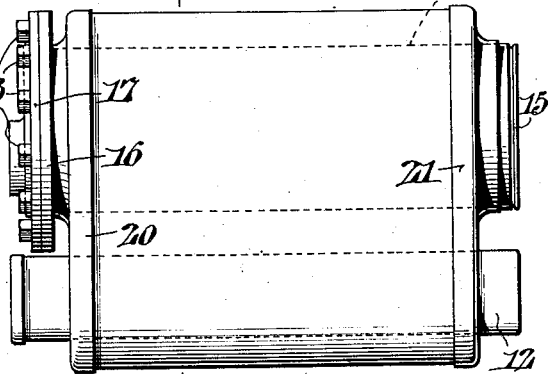
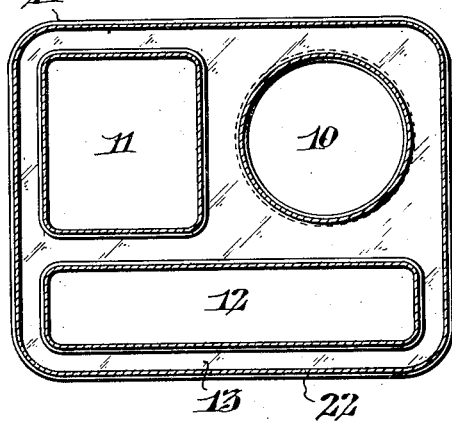
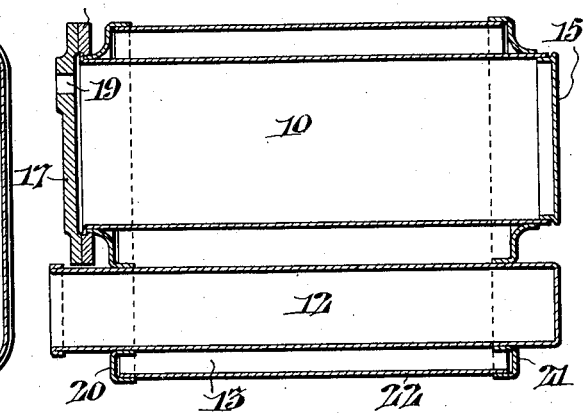
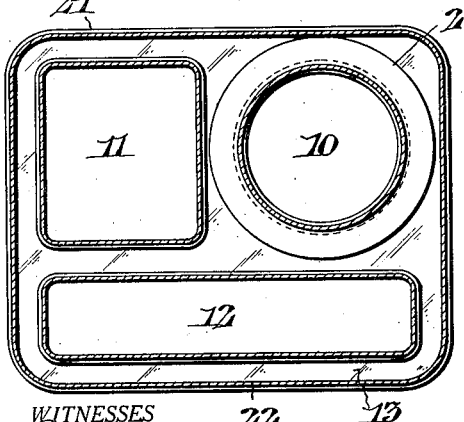
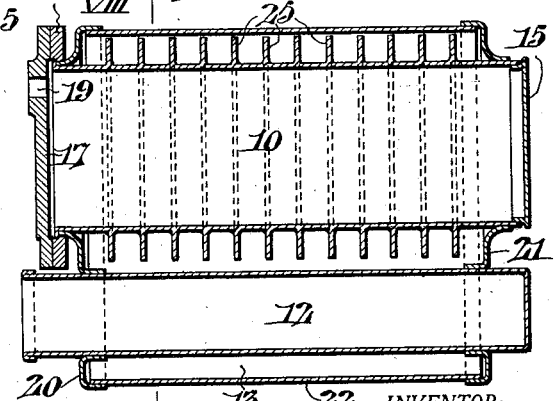

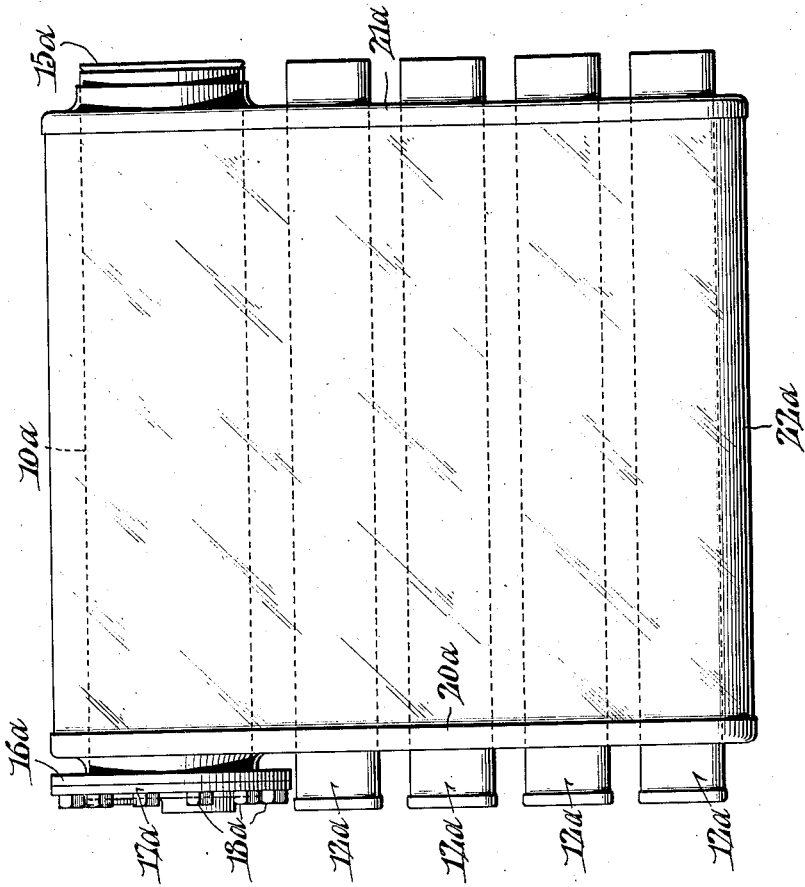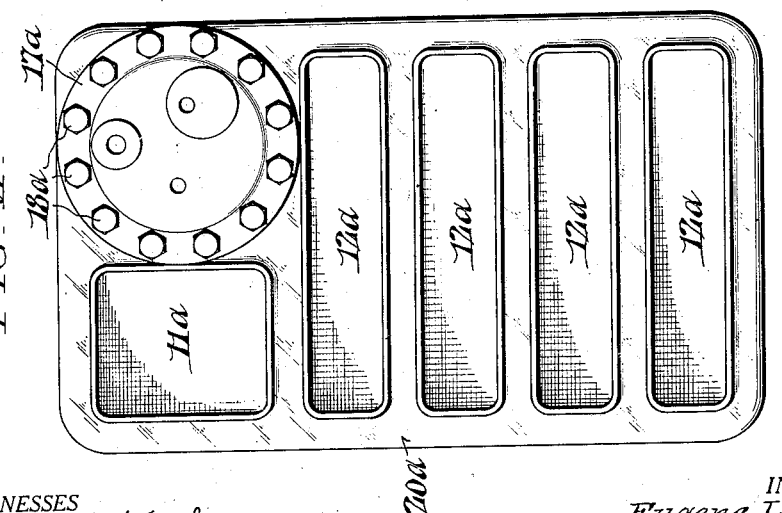

1,787,609

UNITED STATES PATENT OFFICE

EUGENE L. BARNES, OF BUFFALO, NEW YORK

REFRIGERATING APPARATUS

Application filed November 25, 1927. Serial No. 235,466.

My invention relates to refrigerating apparatus, and more particularly to apparatus for developing and utilizing the refrigerating effect from the working substance or refrigerant,—e. g., the "evaporator and cooler" of systems operating on the compression-condensation-vaporization cycle. I aim to provide a simple, convenient, and compact vaporizing and cooling device. In suitable forms of embodiment, such as hereinafter described, the invention lends itself to easy and expeditious manufacture, in a variety of sizes, by assembly of standard parts that can be easily and inexpensively made out of sheet metal. The invention is particularly adapted for "flooded" systems, as they are termed, in which a body of liquid in the low pressure side of the system gradually vaporizes or "boils" as it absorbs heat from the region or locality that it is desired to refrigerate. I have here shown and described embodiments of the invention suitable for use in a refrigerating box or compartment such as the ice chamber of an ordinary household refrigerator.

In the drawings, Fig. I shows a side elevation of a device or apparatus conveniently embodying the invention.

Fig. II shows a front elevation of the same apparatus.

Fig. III shows a vertical longitudinal section through the apparatus, taken as indicated by the line III—III in Fig. II.

Fig. IV shows a vertical transverse section through the apparatus, taken as indicated by the line IV—IV in Fig. I.

Fig. V is a side elevation of a device similar to that shown in Figs. I to IV, but of different proportions.

Fig. VI shows a front elevation of the device shown in Fig. V.

Fig. VII shows a vertical longitudinal section through a device similar to that shown in Figs. I to IV, but with the addition of heat transmitting fins as hereinafter described.

Fig. VIII shows a transverse section through the apparatus shown in Fig. VII, taken as indicated by the line VIII—VIII in Fig. VII.

As shown in Figs. I to IV, the apparatus comprises a longitudinal refrigerant chamber or drum 10 together with one or more longitudinal cooling chambers or compartments for material to be refrigerated. In this instance, there are two such cooling compartments 11, 12, the former an approximately square chamber adapted for keeping food, freezing desserts, or the like, and the latter a wide, shallow horizontal chamber adapted to contain one or more trays for freezing ice cubes or the like. These refrigerants and cooling chambers 10, 11, 12 are enclosed in a tank 13, charged and practically filled with brine or other anti-freezing solution or liquid. As shown in Figs. II and IV, the refrigerant chamber 10 is located in the upper right hand corner of the tank 13, and the cooling chamber 11 in its upper left hand corner. The cooling chamber 12 is located at or in the lower portion of the tank 13, directly beneath the refrigerant chamber 10 and the cooling chamber 11.

As shown in Figs. I to IV, the refrigerant chamber 10 has the character of a cylindrical drum or large tube, extending through the tank 13 from end to end, and projecting somewhat beyond the end walls, and the rectangular compartments 11, 12 are similarly arranged. However, it will, of course, be understood that the chambers 10, 11, 12 need not necessarily project through the rear end wall, nor even extend the full length of the tank 13. As shown in Figs. I and III the rear end of the drum 10 is closed by a cylindrically, flanged cover 15 fitting and permanently secured therein, while its front end is provided with a flange 16 for the attachment of a removable cover plate 17 which may be secured by means of bolts 18. The rear ends of the chambers 11, 12 are also closed. As shown in Fig. II, the cover 17 is provided with tapped openings 19 for such connections to the rest of the refrigerating system as may be desired, including inlet and outlet for liquid and vaporous refrigerant.

As shown in Figs. I and III, the tank 13 consists of " right " and " left " flanged sheet metal end plates 20, 21, which may readily be formed by a die stamping operation, and a sheet metal "wrapper" 22. The margins of the wrapper 22 fit within the lateral marginal flanges of the end plates 20, 21, and may be secured thereto fluid tight by soldering, brazing, or welding. The refrigerant and cooling chambers 10, 11, 12 extend through flanged openings in the end plates 20, 21, and the flanges are secured fluid tight to the chamber walls by soldering, brazing or welding. As shown, the flanges around the openings for the cooling chambers 11, 12 extend inward, while those around the openings for the refrigerant chamber 10 extend outward. It will be seen from Figs. I to IV that there is free passage for the circulation of brine or the like all around the chambers 10, 11, 12. In practice, there is a free and effective circulation of the brine so that the heat from the chambers 11, 12 and from the tank walls is rapidly absorbed by the brine and transferred to the refrigerant in the chamber 10.

By lengthening the chambers 10, 11, 12 and correspondingly widening the wrapper 22 the exposed surfaces and cooling capacity of the device can be increased to any extent desired.

Figs. V and VI illustrate an apparatus similar to that of Figs. I to IV, but larger. In the present instance, this device has four of the thin, flat horizontal cooling chambers 12a, as against one such cooling chamber 12 in Figs. I to IV.

The apparatus shown in Figs. VII and VIII is generally like that of Figs. I to IV, but has heat transferring fins 25 on the exterior of the refrigerant drum 10. As here shown, these fins 25 are flat rings of sheet metal with their internal peripheries soldered, brazed, or welded to the exterior of the drum 10. They may be spaced as close together as is consistent with sufficiently free circulation of the brine amongst them. Preferably, they are out of contact with the wrapper 22 and with the chambers 11, 12, so as to avoid direct transfer of heat from these parts to the drum 10 by metallic conduction: i. e., all the heat is transmitted by conduction or convection by the brine or the like.

Having thus described my invention, I claim:

1. A refrigerating apparatus of the character described comprising end sheets with inward and outward flanged openings, cooling compartments in the inward flanged end sheet openings and a refrigerating chamber in the outward flanged openings, and a wrapper cooperating with the end sheets to form a brine tank around said chambers.

2. A refrigerating apparatus of the character described comprising marginally flanged end sheets with flanged openings therein, refrigerant and cooling chambers extending through said openings, and a wrapper secured to the marginal flanges of said end sheets cooperating with them to form a brine tank around said chambers.

In testimony whereof, I have hereunto signed my name at Buffalo, N. Y., this 16th day of Nov., 1927.

EUGENE L. BARNES.